United States Patent [19]

Kaneko

[11] Patent Number: 4,840,327
[45] Date of Patent: Jun. 20, 1989

[54] APPARATUS FOR MEASURING DRAG-FORCE OF FISHING REEL

[75] Inventor: Kyoichi Kaneko, Tokyo, Japan

[73] Assignee: Daiwa Seiko, Inc., Tokyo, Japan

[21] Appl. No.: 96,919

[22] Filed: Sep. 15, 1987

[30] Foreign Application Priority Data

Sep. 18, 1986 [JP] Japan ................... 61-220780

[51] Int. Cl.$^4$ ............................................ A01K 89/00
[52] U.S. Cl. .................... 242/217; 242/841 J; 242/845 A
[58] Field of Search ............ 242/84.1 J, 84.5 A, 242/217, 84.21 R, 84.51 A; 73/862.32, 862.44, 862.19

[56] References Cited

U.S. PATENT DOCUMENTS

| 2,959,370 | 11/1960 | Denison et al. ............ 242/84.5 A |
| 3,814,349 | 6/1974 | Menne ...................... 242/217 |
| 4,222,537 | 9/1980 | Noda ....................... 242/217 X |
| 4,702,431 | 10/1987 | Kaneko ..................... 242/84.5 A |

FOREIGN PATENT DOCUMENTS 48-50592  7/1973  Japan .

Primary Examiner—Stuart S. Levy
Assistant Examiner—Katherine Matecki
Attorney, Agent, or Firm—Kalish & Gilster

[57] ABSTRACT

A drag-force measuring apparatus for fishing reels wherein a handle shaft and a spool shaft are in non-axially spaced apart relationship; there being motion transmitting a components interconnecting the handle and spool shafts. A drag device is provided for imparting a drag-force to the fishing line wound on the spool carried on the spool shaft. A handle is mounted on the handle shaft for relative rotatable relationship with respect thereto. A drag-force measuring mechanism is fixed on the handle shaft and including a portion outwardly of the handle. A spring interconnects the drag-force measuring mechanism and the handle for limited relative rotation of the handle with respect to the handle shaft.

11 Claims, 3 Drawing Sheets

APPARATUS FOR MEASURING DRAG-FORCE OF FISHING REEL

BACKGROUND OF THE INVENTION

1. Field of the Invention

The present invention relates, in general, to fishing reel drag-force measuring, and, more particularly, to an apparatus which is capable, through simply performed operations, of measuring and indicating the actual drag-force set by a drag device.

2. Description of the Prior Art

A double bearing reel, a spinning reel, a closed face reel and other fishing reels are usually equipped with a drag device for rendering a fishing-line with resistivity against a tensile force greater than the capability of such line as created by an intensive pullback by the hooked fish abrupt reverse rotation when fighting such fish. Such a drag device is disclosed in the specification of Japanese Utility Model Laid-Open No. 50592/1973.

A drag device of this type is generally constructed to comprise drag washers, a lining washer, a compression spring, and a drag adjusting knob; and is adapted to effect frictional damping of the associated fishing-line spool with a predetermined force when the same is about to rotate in the feed-out direction by reason of a pullback-motion of the hooked fish. The drag-force which determines the tensile intensity to feed-out the fishing line is adjusted, commensurately with the particular caught fish and the character of the employed line, by regulating the force to fasten a groups of washers with the aid of the drag adjusting knob.

In the above-described conventional fishing reel drag device, the drag adjusting knob is provided with indicating members, and a reel body is formed with display graduations. The drag-force is exhibited by the indicating members of the knob on the display graduations. The displayed value is not, however, the actual drag-force but is merely the pressure of the spring member against the group of washers as determined by the extent of rotations of the knob. Thus, such is nothing but a criterion of the drag-force. It is, therefore, not feasible to know the actual degree to which the drag-force in effect acts on the spool. Especially when the drag washers undergo abrasion or the spring force decreases because of fatigue of the spring, whereby there is a variance between the numeric value indicated on the graduations and the drag-force, so that it is almost impossible to accurately set a desired drag-force. There is additionally a method wherein the tensile intensity is detected by "feel" feeding out the fishing line wound on the spool when setting the drag-force. There exist obvious differences between individuals, so that unevenness in the setting of the drag-force is produced. As a result, beginners often perform a fastening operation with the drag-force greater than the strength of the fishing line, which causes, in a great majority of cases, undesired line-cutting during fishing.

SUMMARY OF THE INVENTION

Accordingly, it is an object of the present invention to provide an apparatus for measuring the drag-force of a fishing reel which permits both the measurement and the recognition of the actual drag-force imparted to the spool by the drag device.

It is another object of the present invention to provide apparatus of the character stated which is capable of readily setting the drag-force suitable for the particular fishing conditions and the employed fishing line.

It is a further object of the present invention to provide an apparatus of the character stated which is readily adapted for use with fishing reels of substantially all type and thus demonstrates a marked versatility.

It is another object of the present invention of provide an apparatus of the character stated which is economically produced; which consists of a limited number of durable components; which is readily adaptable for effective yet compact inclusion within a fishing reel of preselected characteristics; and which is extremely reliable and durable in usage.

DETAILED DESCRIPTION OF THE PREFERRED EMBODIMENTS

Figure 1:
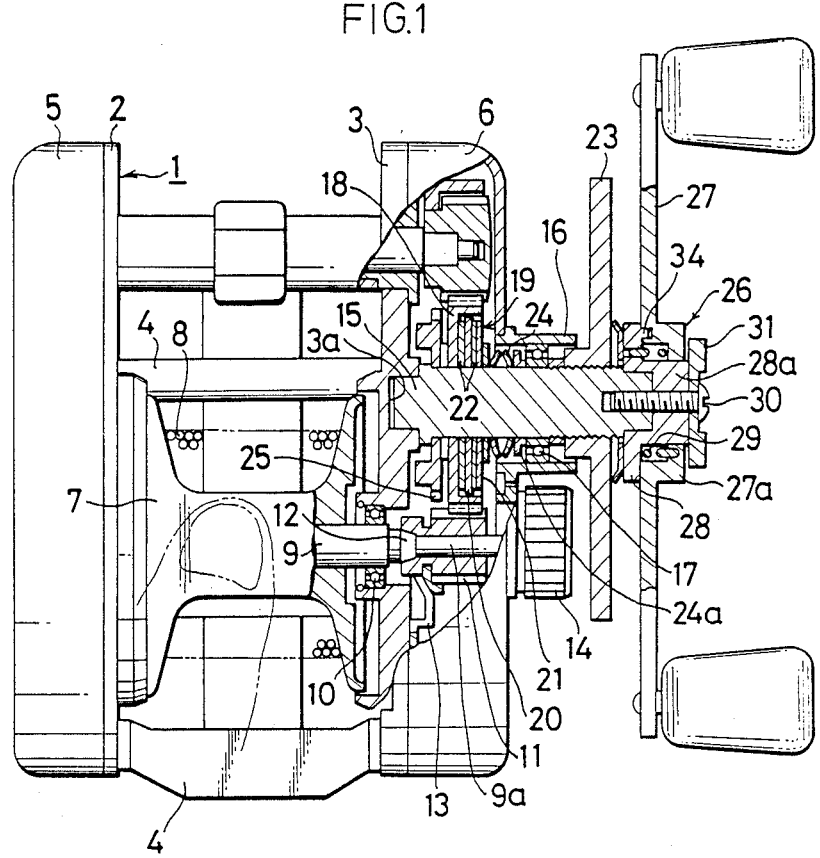
FIG. 1 is a partially cutaway plan view of a double bearing type fishing reel equipped with a drag-force measuring apparatus constructed in accordance with and embodying the present invention.
Figure 2:
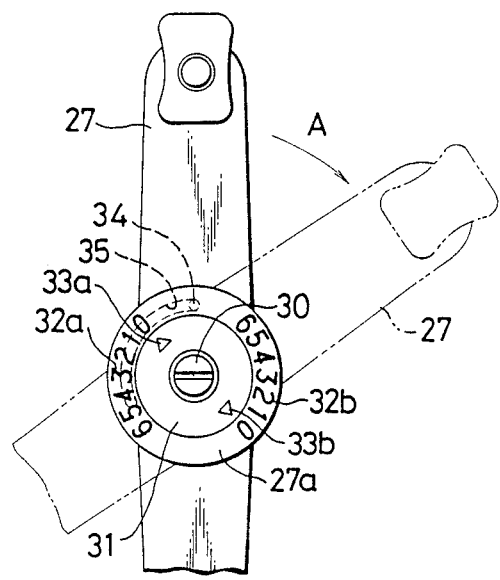
FIG. 2 is a front view of the mechanism for measuring the darg-force.
Figure 3:
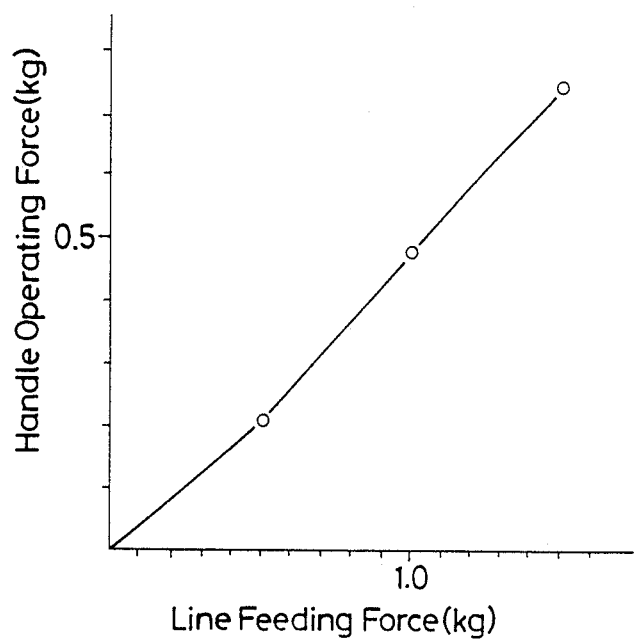
FIG. 3 is a chart showing the relationship between a line feeding force and a handle operating force.

Referring now by reference characters to FIGS. 1 to 3, inclusive, of the accompanying drawings which illustrate a double bearing type fishing reel equipped with a drag-force measuring apparatus incorporating the present invention.

The numeral 1 denotes a reel frame body which consists of confronting side frames 2,3 spaced apart a predetermined distance, and maintained in such relationship by a plurality of interconnecting support pillars 4. The numeral 5 designates a left side plate serving as a cover being attached to the left side frame 2, and there is provided a right side plate 6 serving as a cover, being attached to the right side frame 3.

A spool 7 is disposed between the right and left side frames 2,3 of reel frame body 1 and wound thereabout is a fishing line 8; there being a spool shaft 9 upon which said spool 7 is fixed. One end of spool shaft 9 is rotatably supported through a bearing (not shown) carried on left side plate 5, and the other or opposite end of said shaft 9 is rotatably supported by a bearing 10 on the side frame 3. A shaft member 9a extends from one end of spool shaft 9, penetrates side frame 3, and protrudes therebeyond for extension to the inner side of right side plate 6; shaft member 9a having mounted thereon a pinion gear 11 which is relatively rotatable thereto as well as being axially slidable thereon. One end of pinion gear 11 is adapted for engagement with, and disengagement from, a clutch 12 mounted on spool shaft 9. The engagement and disengagement between pinion gear 11 and clutch 12 are effected by means of an operating plate 13. The end of shaft member 9a engages a cast control mechanism 14 secured to right side plate 6.

Numeral 15 designates a handle shaft disposed on right side plate 6 in axial parallel relation to spool haft 9.

One or the inner end of handle shaft 15 is rotatably received in a shaft bore 3a formed in side frame 3, and the other or outer end thereof projects through right side plate 6; the outer end portion being rotatably supported by a bearing 17 in a cylindrical casing 16 mounted on right side plate 6. A drive gear 18 meshing with pinion gear 11 is fitted to the inside of right side plate 6 of the handle shaft 15 in a relatively rotatable manner and is frictionally connected through a drag device 19 to the handle shaft 15.

The drag device 19, as illustrated in FIG. 1, comprises a first drag washer 20 which is relatively rotatable with respect to handle shaft 15 but is fixed relative to drive gear 18; a second drag washer 21 which is fixed relative to handle shaft 15 but is relatively rotatable with respect to drive gear 18; a lining washer 22 interposed between drag washers 20,21 and drive gear 18; a drag-force adjusting knob 23 which is spirally fitted to handle shaft 15; and a drag-force adjusting plate spring 24 interposed between knob 23 and drag washer 21 through the intermediary of the inner ring of bearing 17 and a spring bearing 24a. 25 denotes a ratchet wheel, fixed to handle shaft 15 for preventing reverse rotation of spool 7. There is provided a pawl member (not shown) engageable with, and disengageable from, ratchet wheel 25 by manual operation.

In FIG. 1, the numeral 26 indicates a drag-force measuring mechanism for measuring the drag-force imparted by drag device 19, and is mounted on the outer, projecting end of handle shaft 15 and is provided with a handle 27 designed for line winding operation.

Drag-force measuring mechanism 26 includes a handle supporting member 28 and a drag-force measuring torsion spring 29 for producing torque in handle 27 which torque is equivalent to the drag-force provided by drag device 19. Handle supporting member 28 is secured to the outer end face of handle shaft 15 as by means of a screw 30. A boss 27a integral with handle 27 is rotatably engaged to a cylindrical portion 28a of handle supporting member 28 and is additionaly maintained by an end plate 31 also secured screw 30. Torsion spring 29 is disposed within boss 27a, and the ends thereof, respectively, are connected to boss 27a and to handle supporting member 28. The end surface of handle boss 27a as illustrated in FIG. 2, includes opposed like series of display graduations 32a, 32b which serve to indicate an actually measured drag-force value imparted by drag-device 19; said graduations 32a, 32b being disposed with a phasic difference of 180° in the peripheral direction thereof. The outer surface of end plate 31 is provided with indicating members 33a, 33b for coordination with graduations 32a, 32b.

In FIGS. 1 and 2 the numeral 34 represents a protrusion provided on handle supporting member 28, which is engageble with a confronting arcuate groove 35 formed in handle boss 27a. Protrution 34 and groove 35 coact to restrict the rotational operating angle of handle supporting member 28 to within the range of display graduations 32a, 32b and for prescribing the position to which handle 27 is caused to revert through bias of torsion spring 29 so that indicating member 33a 33b will show a value of "0" on individual display graduations 32a 32b.

The operation of the thus constructed drag-force measuring apparatus employed in this embodiment will now be explained.

Initially, an adjustment is made to obtain the drag-force corresponding to the particular thickness of fishing line 8 and to the fishing conditions by rotationally operating adjusting knob 23 of drag device 19. At this time, the pressure of plate spring 24 varies in proportion to the degree of rotation of adjusting knob 23, and the group of laminated washers are, on the whole pressurized in accordance with the spring pressure. Drive gear 18 and handle shaft 15 are frictionally connected to each other by means of a frictional force proportional to the pressurizing force, thereby imparting a drag-force which is undetermined in terms of numeric value to spool 7.

After the adjustment of the drag-force of drag device 19 has been completed, as illustrated in FIG. 1, the thumb of one hand holds spool 7. Handle 27 is grasped by the other hand and is, as depicted in FIG. 2, rotationally operated in the direction indicated by the arrow A. Concomitantly, drag-force measuring torsion spring 29 is elastically deformed in the winding direction, whereby the rotary torque acting on handle 27 is gradually increased. As a result, when the rotary torque generated in proportion to the amount of elastic deformation of torsion spring 29 is slightly greater than the drag-force indicated by drag device 19, a slippage state is produced between drag device 19 and the drag washers, whereby the portion inclusive of handle shaft 15 is rotated together with handle 27 in the direction indicated by arrow A (FIG. 2). Therefore, the actual drag-force set by drag device 19 is the numeric value that each of the indicating members 33a, 33b respectively indicates on display graduations 32a, 32b when the handle shaft 15 rotates with handle 27.

FIG. 3 is a chart showing the relationship obtained by the actually measured values between the line feeding force (drag-force) of the axis of the abscissa by which the line is fed out of spool 7 resisting the drag-force and the operating force (handle torque) of the axis of the ordinate which acts on the handle when the slippage is created between the drag washers in the case of rotationally operating the handle 27 in the winding direction in while the spool is fixed. As can be seen from the chart of FIG. 3, the two types of forces are proportional to each other. Consequently, it is possible to accurately measure and display the drag-force from the amount of relative rotational displacement between handle 27 and handle supporting member 28 (handle shaft).

It is therefore possible to know precisely whether the set drag-force is suited to fishing line 8 and to the fishing conditions or otherwise by observing the numeric values that members 33a, 33b indicate on graduations 32a, 32b at the time of operating the handle. This demonstrates that if the fisherman uses, for instance, a six pound line, drag-force adjusting knob 23 may be adjusted so that the drag-force is set to the numeric value "2" on the graduations. With this arrangement, even beginners in fishing can readily set an adequate drag-force, which prevents the line being severed because the drag-force was inadequately set. In addition, the properties of drag device 19 can be confirmed on the basis of actual measurement, and hence it is feasible to recognize exactly the condition of abrasion (lifetime) relative to the drag washers and so on. Furthermore, the maintenance of drag device 19 can be facilitated; thereby improving the reliability of the reel.

Inasmuch as the line winding handle 27 is utilized for measuring the drag-force, there is required a small amount of operating force to resist torsion spring 29 when effecting the measuring process, which can therefore be facilitated.

Figure 4:
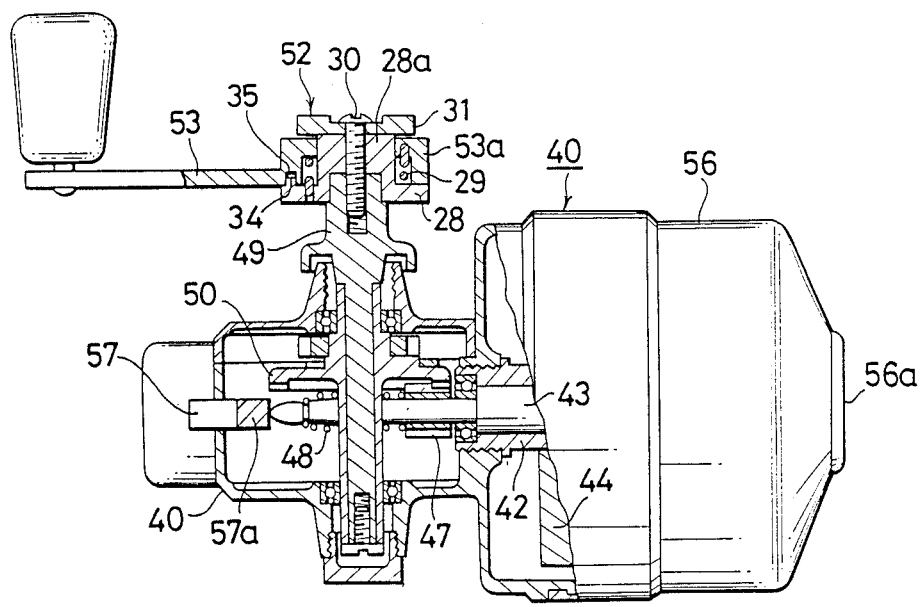
FIG. 4 is a partially cutaway plan view showing the drag-force measuring apparatus embodying the present invention as applied to a closed face type fishing reel.
Figure 5:
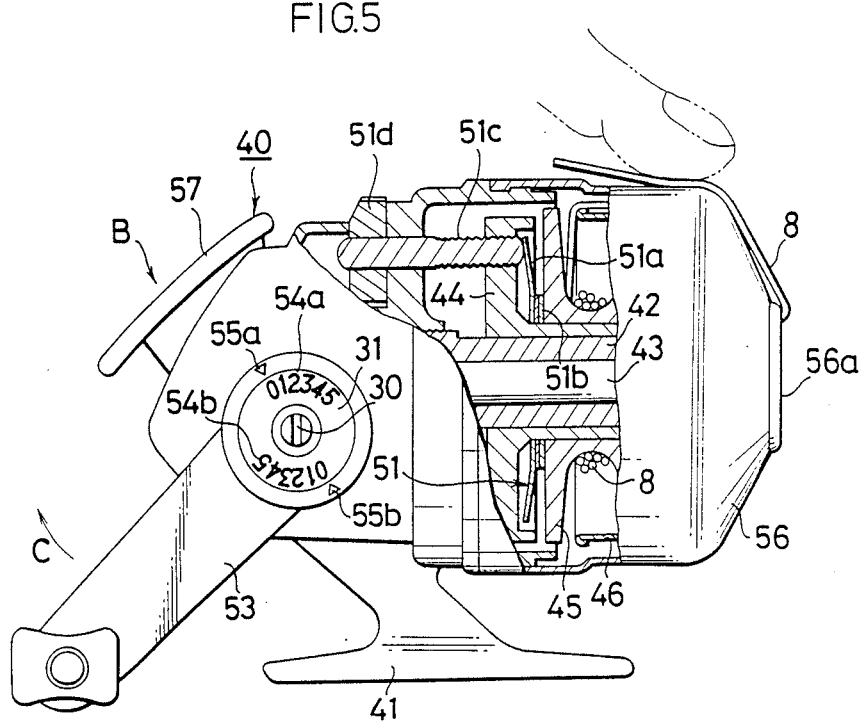
FIG. 5 is a partially cutaway side elevational view thereof.

Referring to FIGS. 4 and 5 there is shown an example wherein the method of measuring the drag-force according to the present invention is applied to a closed face type fishing reel.

Therein 40 designates a reel frame body having an installation leg 41. One end of a fixed shaft cylinder 42 is fastened to the front central portion of the reel frame 40 with a screw, and a rotary shaft 43 extends axially through the bore of cylinder 42 such as to be supported rotatably and axially reciprocably. A spool 45 is rotatably so fitted as to be supported on the holding plate 44 attached to the outer periphery of fixed shaft cylinder 42. A rotor 46 for winding the spool 45 with the fishing line 8 is secured to a front end protrusion of rotary shaft 43. A pinion gear 47 is fitted to a rear protrudent shaft member 43a of rotary shaft 43 in such a manner that gear 47 is fixed against relative rotation but is axially slidable. The numeral 48 indicates a spring for unvaryingly biasing rotary shaft 43 rearwards. The numeral 49 denotes a handle shaft attached to the reel frame body 40 in a direction prependicular to rear protrudent shaft member 43a. Handle shaft 49 is rotatably supported on the reel frame body 40 and mounts a drive gear 50 which engages with pinion gear 47.

Numeral 51 represents a drag device for imparting a drag-force to spool 45, and consists of: a damping plate 51a interposed between spool 45; and a damping force (drag-force) adjusting screw rod 51c which is movably supported on reel frame body 40 in axially parallel relation to rotary shaft 42; and with one end thereof linked to damping plate 51a; and a drag-force adjusting knob 51d for spirally fitted screw rod 51c which serves to project and retract damping plate 51a.

Numeral 52 denotes a drag-force measuring mechanism mounted on handle shaft 49, which is, as in the structure shown in FIG. 1, equipped with a drag-force measuring torsion spring 29 for producing a torque in handle supporting member 28 and in the handle 53; such torque being equivalent to the drag-force of drag device 51. Handle supporting member 28 is fastened to the end of handle shaft 49 by a screw 30. A boss 53a on handle 53 is rotatably fitted to the cylindrical member 28a of handle supporting member 28, and is held by an end plate 31 secured screw 30 as to prevent accidental removal. Torsion spring 29 is disposed within boss 53a, the opposite ends of which are connected to handle boss 53a, and to handle supporting member 28, respectively. The surface of the end plate 31 is, as illustrated in FIG. 5, formed with display graduations 54a, 54b for displaying the actually measured value of the drag-force, and the end surface of handle boss 53a is provided with indicating members 55a, 55b for indicating the value on the respective display graduations 54a, 54b. Handle supporting member 28 and handle boss 53a, as in the structure illustrated in FIG. 1, include a protrusion 34 and arcuate groove 35 for receiving said protrusion 34.

A front cover 56 is attached to the front portion of reel frame body 40 such as to cover both spool 45 and rotor 46, and line 8 is feed outwardly through front opening 56a. A push lever 57 is rotatably fitted to the rear portion of reel frame body 40. Upon application of pressure on push lever 57 in the direction indicated by arrow B, the tip-forming end 57a thereof engages the edge of shaft extension 43a, thereby causing rotary shaft 43 to be moved forwardly. Fishing line 8 is regulated by pushing rotor 46 against the inner surface of cover 56, causing the same to stop. Rotor 46 returns to a free state for rotation when force against push lever 57 is discontinued.

In the thus constructed closed face type fishing reel, when measuring the drag-force imparted to spool 45 by drag device 51, line 8 is fed outwardly of opening 56a and is, as depicted in FIG. 5, pushed against the outer peripheral surface of cover 56 with the thumb of one hand, and rotor 46 is in non-rotatable state by virtue of engagement of a pick-up pin (not shown).

In such a condition, handle 53 is rotationally operated in winding direction of torsion spring 29 as indicated by arrow C in FIG. 5. When the resulting torque created on handle 53 exceeds the drag-force set by drag device 51, the rotational force of handle 53 is transmitted through drive gear 50, pinion gear 47, shaft 43, and rotor 46 to spool 45 connected by line 8. As a result, spool 45, damped by drag device 51, beings to rotate freely, resisting the wearing resistance thereof.

Hence, it is feasible to display the numeric value, defined as the actual drag-force set by the drag device 51, which is read on display graduations 54a, 54b with the aid of the indicating members 55a, 55b indicating the amount of relative rotational displacement between handle boss 53a and handle supporting member 28 (handle shaft) when the above-described free-rotation starts.

Thus, even with the closed face type fishing reel, the measurement display of the drag-force is easily effected as in the case of the double bearing type fishing reel.

Figure 6:
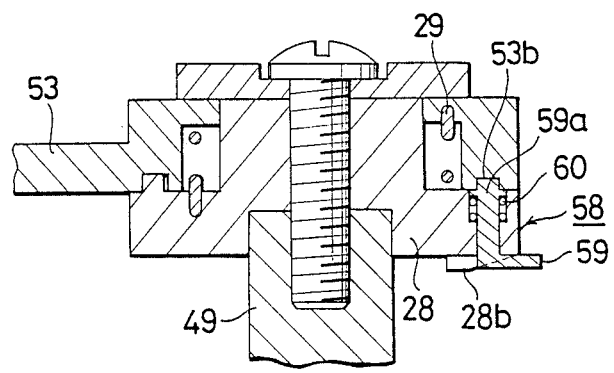
FIG. 6 is a sectional view illustrating a handle provided with a lock mechanism embodying the present invention.

FIG. 6 illustrates still another embodiment wherein the handle is provided with a lock mechanism 58 which comprises a cam surface 28b formed on supporting member 28 and an operating lever 59 including an engagement member 59a provided at its outer end are biased towards handle 52 by means of a spring 60 and are thereby rotatably interengaged. An engagement recess 53b which receives member 59a is formed in an impingement surface of handle 53.

The measurement of the drag-force by using the thus constituted lock mechanism 58 will now be explained. After the drag-force has completely been adjusted by the drag device, engagement member 59a of operating lever 59 is separated from recess 53b formed in handle 53, against the pressure of spring 60, through the cam action of cam surface 28b which is caused by turning the operating lever 59, thus releasing the handle lock. As a result of these steps, there is created a state where the drag-force can be measured in a manner similar to that of the previously described embodiment.

Upon completion of both the measurement and the setting of the drag-force, operating lever 59 is rotationally restored to locked state. Consequently, it is possible to perform a conventional handle-winding operation without subjection to any influence of torsion spring 29.

The apparatus for measuring the drag-force according to the present invention is not confined to the above-described fishing reels but may, as a matter of course, be applied to other spinning reels. The structure in which the handle is supported on the handle shaft is not limited to the one described in the aforementioned embodiment.

As is obvious form the above description, the present invention provides the following advantages: the handle designed for the fishing line winding operation is installed in a relatively rotatable manner, and is connected through the measuring spring member to the handle shaft. The drag-force set by the drag device from the rotational torque produced by rotationally operating the handle is conversion-displayed on the display graduations. With this arrangement, it is feasible to accurately determine the actual drag-force set by the drag device. Furthermore, the drag-force suited to the particular fishing line employed, and to the obtaining fishing conditions can readily be set. In addition, since the drag-force is measured by manipulating the line-winding handle, the measuring process can be facilitated, and the apparatus can be minaturized.

What is claimed is:

1. A fishing reel comprising a casing, a spool shaft, a spool carried on said spool shaft, a fishing line wound about said spool, means rotatably maintaining said spool shaft in said casing, a handle shaft having inner and outer portions, a bearing rotatably supporting the inner portion whereby the outer portion is located outwardly of said casing, a handle, means mounting said handle on said handle shaft on the outer portion for relative rotatable motion with respect thereto, a drag-force adjusting knob rotatable on said handle shaft, a drive gear disposed on said handle shaft, a drag device mounted on said handle shaft inwardly of said handle for preselected pressure-setting by rotation of said adjusting knob, said drag device frictionally connecting said drive gear to said handle shaft and interconnecting said drive gear and said adjusting knob and comprising an assembly of laminated washers interengaging said drive gear and said handle shaft and spring means disposed between said drag-force adjusting knob and said washers, whereby said washers are pressurized commensurate with the pressure applied on said spring means by operation of said adjusting knob for effecting the frictional connection of said drive gear to handle shaft, means operatively connecting said handle shaft and said spool shaft for transmitting torque from said handle shaft proportional to the pressure force on the washers to said spool shaft, said torque transmitting means comprising a pinion gear mounted on said spool shaft and engageable with said drive gear, a drag-force measuring mechanism fixed on said handle for applying on said handle a torque slightly greater than the torque applied by said drive gear on said handle shaft, and cooperative visual drag-force display means provided on said drag-force measuring mechanism and said handle.

2. A fishing reel as defined in claim 1 wherein said handle shaft is axially parallel to said spool shaft.

3. A fishing reel as defined in claim 1 wherein said drag-force measuring mechanism includes resilient means for applying the torque on said handle.

4. A fishing reel as defined in claim 1 wherein said cooperative display means comprises at least one indicator member provided on said drag-force measuring mechanism and a series of numeric graduations provided on said handle for coordination with said at least one indicator member.

5. A fishing reel as defined in claim 1 wherein said resilient means is a torsion spring having opposite ends, one end thereof being engaged to said handle, the other end thereof being engaged to said drag-force measuring mechanism.

6. A fishing reel as defined in claim 1 wherein disengageable locking means interconnect said handle and said drag-force measuring mechanism.

7. A fishing reel comprising a casing, a spool shaft, a spool carried on said spool shaft, a fishing line wound about said spool, means rotatably mounting said spool shaft in said casing, a handle shaft having inner and outer end portions, a bearing rotatably supporting the inner portion whereby the outer portion is located outwardly of said casing, a handle, means mounting said handle on said handle shaft on the outer end portion for relatively rotatable motion with respect thereto, a drag device engaged to said spool shaft for applying a preselected drag-force to said spool shaft, gear means connecting said handle shaft and said spool shaft, a drag-force measuring mechanism fixed on said handle for applying on said handle a torque slightly greater than the drag-force applied to the spool shaft by said drag device, and cooperative visual drag-force display means provided on said drag-force measuring mechanism and said handle.

8. A fishing reel as defined in claim 7 wherein said handle shaft is axially perpendicular to said spool shaft.

9. A fishing reel as defined in claim 7 wherein said means operatively connecting said handle shaft and said spool shaft comprises a drive gear mounted on said handle shaft and a pinion gear mounted on said spool shaft.

10. A fishing reel as defined in claim 7 wherein said drag-force measuring mechanism includes a a torsion spring having opposite ends, one end thereof being engaged to said handle, the other end thereof being engaged to said drag-force measuring mechanism.

11. A fishing reel as defined in claim 7 wherein disengageable locking means interconnect said handle and said drag-force measuring mechanism.

* * * * *